US011073300B2

(12) United States Patent
Koeger et al.

(10) Patent No.: US 11,073,300 B2
(45) Date of Patent: Jul. 27, 2021

(54) BLAST VALVE UTILIZING AN AERODYNAMICALLY CONFIGURED BLADE

(71) Applicant: BETH-EL ZIKHRON YAAQOV INDUSTRIES LTD., Zikhron Yaaqov (IL)

(72) Inventors: Samuel Koeger, Zikhron Yaaqov (IL); Jonathan Schneider, Zikhron Yaaqov (IL)

(73) Assignee: BETH-EL ZIKHRON YAAQOV INDUSTRIES LTD., Zikhron Yaaqov (IL)

(*) Notice: Subject to any disclaimer, the term of this patent is extended or adjusted under 35 U.S.C. 154(b) by 336 days.

(21) Appl. No.: 16/332,963

(22) PCT Filed: Sep. 5, 2017

(86) PCT No.: PCT/IL2017/050996
§ 371 (c)(1),
(2) Date: Mar. 13, 2019

(87) PCT Pub. No.: WO2018/051331
PCT Pub. Date: Mar. 22, 2018

(65) Prior Publication Data
US 2019/0257549 A1 Aug. 22, 2019

(30) Foreign Application Priority Data
Sep. 13, 2016 (IL) .......................... 247805

(51) Int. Cl.
F24F 13/15 (2006.01)
F24F 13/14 (2006.01)
(Continued)

(52) U.S. Cl.
CPC .......... *F24F 13/1413* (2013.01); *F16K 31/34* (2013.01); *F24F 13/15* (2013.01); *F24F 13/24* (2013.01); *F24F 2013/247* (2013.01)

(58) Field of Classification Search
CPC ....... F24F 13/1413; F24F 13/15; F16K 1/165; F16K 15/035; Y10T 137/87475; Y10T 137/87483; Y10T 137/87563
See application file for complete search history.

(56) References Cited

U.S. PATENT DOCUMENTS 1,872,599 A * 8/1932 Le Grand ............. F24F 13/075
49/95
3,075,448 A  1/1963 Cohen
(Continued)

FOREIGN PATENT DOCUMENTS

EP  1630486 A2  3/2006
EP  2784406 B1  9/2020
(Continued)

OTHER PUBLICATIONS

International Search Report for Application No. PCT/IL2017/050996, dated Sep. 5, 2017, 3 Pages.

*Primary Examiner* — Reinaldo Sanchez-Medina
(74) *Attorney, Agent, or Firm* — Brooks Kushman P.C.

(57) ABSTRACT

A louver type blast valve making use of an aerodynamically configured blade, independently activated by air flow to block a blast shock wave and a subsequent return suction wave. The blast valve (FIG. 6) including a frame and at least one aerodynamically configured blade, independently activated by air flow to block a blast shock and a potentially following return wave. The aerodynamically configured blade having an elongated shape, including at least a steep convex surface and a flat or shallow concave surface, forming a leading edge and a trailing edge at the intersection of the surfaces. The blade being hinged to the frame about (Continued)

a longitudinal axis passing between the steep convex surface and the flat or shallow concave surface.

18 Claims, 13 Drawing Sheets

(51) Int. Cl.
*F16K 31/34* (2006.01)
*F24F 13/24* (2006.01)

(56) References Cited

U.S. PATENT DOCUMENTS

| | | | |
|---|---|---|---|
| 3,140,648 A | 7/1964 | Bergman et al. | |
| 3,214,156 A | 10/1965 | Klose et al. | |
| 3,223,020 A | 12/1965 | Rickenbach | |
| 3,232,208 A | 2/1966 | Maassen | |
| 3,296,952 A | 1/1967 | Lingal | |
| 3,301,168 A | 1/1967 | Schindler et al. | |
| 3,363,540 A | 1/1968 | Mason | |
| 3,369,476 A | 2/1968 | Seiz et al. | |
| 3,374,725 A | 3/1968 | Schierse et al. | |
| 3,381,601 A | 5/1968 | McCabe | |
| 3,402,655 A | 9/1968 | Stephenson et al. | |
| 3,420,155 A | 1/1969 | Slater | |
| 3,420,264 A | 1/1969 | Dolling | |
| 3,459,114 A | 8/1969 | Baclini | |
| 3,489,073 A | 1/1970 | Sauter et al. | |
| 3,516,348 A | 6/1970 | Laakkonen et al. | |
| 3,524,468 A | 8/1970 | Hartel | |
| 3,561,346 A | 2/1971 | Stephenson | |
| 3,605,603 A | 9/1971 | McCabe | |
| 3,643,583 A | 2/1972 | Fritz | |
| 3,650,069 A | 3/1972 | Alley | |
| 3,662,670 A | 5/1972 | McCoy | |
| 3,771,559 A * | 11/1973 | Alley | F16K 1/165 |
| | | | 137/601.06 |
| 3,833,989 A | 9/1974 | McCabe | |
| 3,841,350 A | 10/1974 | Griensteidl et al. | |
| 3,908,529 A | 9/1975 | McCabe | |
| 3,972,348 A * | 8/1976 | Hagar | F23L 13/08 |
| | | | 137/601.09 |
| 4,256,143 A * | 3/1981 | Magill | F24F 13/15 |
| | | | 137/601.06 |
| 4,301,833 A | 11/1981 | Donald | |
| 4,351,359 A | 9/1982 | Scherwarth | |
| 4,576,088 A | 3/1986 | Mathewes et al. | |
| 4,655,122 A | 4/1987 | McCabe | |
| 4,733,606 A | 3/1988 | Frestadius et al. | |
| 4,751,874 A | 6/1988 | Quarterman | |
| 4,993,886 A * | 2/1991 | Hofstetter | B65G 53/66 |
| | | | 137/521 |
| 5,020,423 A | 6/1991 | Hill | |
| 5,187,316 A | 2/1993 | Hasler et al. | |
| 5,540,618 A | 7/1996 | Alwis et al. | |
| 6,254,475 B1 * | 7/2001 | Danieau | B60H 1/00671 |
| | | | 454/156 |
| 2008/0254733 A1 * | 10/2008 | Mutton | F24F 13/15 |
| | | | 454/169 |
| 2009/0318072 A1 | 12/2009 | Perera | |
| 2013/0072103 A1 | 3/2013 | Hopkins et al. | |

FOREIGN PATENT DOCUMENTS

| | | |
|---|---|---|
| GB | 2203530 A | 10/1988 |
| WO | 2008059251 A2 | 5/2008 |
| WO | 2009136004 A1 | 11/2009 |
| WO | 2009136006 A1 | 11/2009 |

* cited by examiner

BLAST VALVE UTILIZING AN AERODYNAMICALLY CONFIGURED BLADE

CROSS-REFERENCE TO RELATED APPLICATION

This application is the U.S. national phase of PCT Application No. PCT/IL2017/050996 filed on Sep. 05, 2017, which claims priority to IL Patent Application No. 247805 filed on Sep. 13, 2016, the disclosures of which are incorporated in their entirety by reference herein.

FIELD OF THE INVENTION

The present invention relates to a blast valve, and more particularly to a louver type blast valve making use of an aerodynamically configured blade, independently activated by air flow to block a blast shock wave and a subsequent return suction wave.

BACKGROUND OF THE INVENTION

It is known in the art of life saving bomb shelters and fire protected facilities, to use a blast valve in the ventilation path. Such blast valve normally permits free air flow for ventilation purposes, but should rapidly block high pressure blast shock wave caused by explosion. The rapid action is essential in order to block the impact of the blast shock wave before injury to the shelter occupants may occur. Normally the blast wave is followed by a return wave which is a blast wind of negative pressure that may drive large backward suction forces. Those suction forces may also impose risk to the shelter occupants and should be blocked to the same extent.

Known blast valves can be divided into several categories:

A. Blast valves which are operated remotely by special sensor devices directly exposed to the blast and require some power source to change the state of the valve, sometimes called dynamic blast valves. Examples of such designs can be found in: U.S. Pat. Nos. 3,214,156, 3,363,540, 3,524,468, 3,643,583. These devices require constant maintenance and periodical testing for proper operation.

B. Passive air blast attenuation device or choke, dissipating the energy of the blast shock wave by means of self reflection or interference patterns. Examples of such designs can be found in: U.S. Pat. Nos. 4,751,874, 5,187,316, 5,540,618, US2009/0318072. These designs however are only appropriate for short term pressure surges and may not provide protection against the return wave.

C. Blast valves that use an axially displaceable disc or pivotal flap, which is pressed against a seat by the blast wave pressure, thus blocking the blast shock wave. A latch is provided to prevent reopening of the disc or flap upon cease of the blast shock wave in order to block the subsequent return wave as well. Examples of such designs can be found in: U.S. Pat. Nos. 3,369,476, 3,420,155, 3,420,264, 3,459,114. These devices require manual reopening of the ventilation path after an activated by a blast incident.

D. Blast valves that use an axially displaceable disc or pivotal flap, in a construction called a pendulum gate, where the disc or flap is held at a central position by its weight or by biasing springs. Upon an instance of blast shock wave or a return wave the disc or flap is pressed by the wave pressure against one of two opposing seats located at both sides of the disk or flap. The pendulum design effectively blocks both the blast shock wave and the return wave. Another advantage of the pendulum construction is the ability of the blast valve to return to the desired open state upon cease of the blast high pressure impact and cease of the return wave, without intervention of the shelter occupants. Examples of such constructions can be found in: U.S. Pat. Nos. 3,140,648, 3,223,020, 3,232,208, 3,301,168, 3,374,725, 4,351,359, 3,516,348, 3,489,073, 3,516,348, 3,841,350, 4,351,359.

E. A variant of the above D design, making use of plurality of displaceable round bars located between an array of fixed round bars, such that the central axis of the displaceable bar is vertically located against a gap between a pair of the fixed bars. The gap is smaller than the diameter of the displaceable bars such that upon an instance of a blast shock, the displaceable bars are pushed against the gap between the fixed bars and the gap is sealed by the displaceable bars. Examples of such constructions can be found in: U.S. Pat. Nos. 3,296,952, 4,733,606.

F. Due to the large mass inertia of the moving elements of the above mentioned types, some blast valves use a ventilation air bypass for delay purpose. The bypass leads the blast sock wave through a longer route such that the disk or flap is externally actuated prior to arrival of the shock wave through the ventilation bypass. Examples of such designs can be found in: U.S. Pat. Nos. 3,075,448, 3,402,655, 3,561,346.

A common critical drawback of the above C to F blast valve categories, is air flow restriction caused by curved flow path and various flow-constraining valve elements located in the flow path. To enable a desired air flow capacity, the valve must accept large dimensions which in turn require heavier construction, and thick gauge steel elements which slow down the response time.

G. In order to improve the air flow capacity through a given opening area, louver type blast valves were introduced. Louver blast valves are equipped with plurality of swivel blades that change state from the fully open position where the blades are set parallel to the flow path, imposing minimal restriction of the flow, to the fully closed position where the blades are set transversal to the flow path.

The basic principal of operation is known from the art of dampers or backdraft dampers. Examples of such dampers can be found in: U.S. Pat. Nos. 3,381,601, 3,605,603, 3,650,069, 3,833,989, 3,908,529, 5,020,423. Some backdraft damper designs use the air flow to change position of the blades such as U.S. Pat. No. 4,576,088 suggesting blades with initial slope that are forced to the closed position by reverse flow, or U.S. Pat. No. 4,655,122 suggesting an aerodynamic blade shape with improved lift, that is forced to the open position by foreword flow.

Dampers however are not subject to high differential pressures as those required for blast valves, hence the blade structure of louver type blast valve is much heavier than those found on dampers. Accordingly changing the state of a blast valve blade by air forces only is not trivial.

U.S. Pat. No. 3,662,670, WO2009/136004 and WO2009/136006 for example, are louver type blast valves, where spring loaded blades have to be manually reset and latched at the open state. A pressure sensitive trigger mechanism is provided in order to release the latch in case of an explosion. Upon release of the latch, the blades are forced by the spring to the closed state and are latched at the closed position until manually reset back to the open state.

In view of the above A to G blast valve categories, the G type louver blast valve clearly have the best air flow characteristics with minimum disturbance of the air flow at the open state. However its operation is complex due to the trigger and reset mechanism that require human intervention. On the other hand, the D and E type pendulum gate structure is the best in view of ease of operation, but its air flow capacity is severely restricted.

SUMMARY OF THE INVENTION

Accordingly, it Is a principal object of the present invention to overcome the disadvantages and limitations of prior art systems and provide a louver type blast valve making use of an aerodynamically configured blade, independently activated by air flow to block a blast shock wave and a subsequent return suction wave.

These and other subjects are achieved according to the present invention by providing a blast valve including a frame and at least one aerodynamically configured blade, independently activated by air flow to block a blast shock and a potentially following return wave, the aerodynamically configured blade accepts an elongated shape, including at least a steep convex surface and a flat or shallow concave surface, forming a leading edge and a trailing edge at the intersection of the surfaces. The blade being hinged to the frame about a longitudinal axis passing between the steep convex surface and the flat or shallow concave surface.

BRIEF DESCRIPTION OF THE DRAWINGS

The invention and the way it may be carried out in practice, will be understood with reference to the following illustrative figures, by way of non-limiting example only, in which like reference numerals identify like elements, and in which.

DETAILED DESCRIPTION OF EMBODIMENTS

Figure 1:
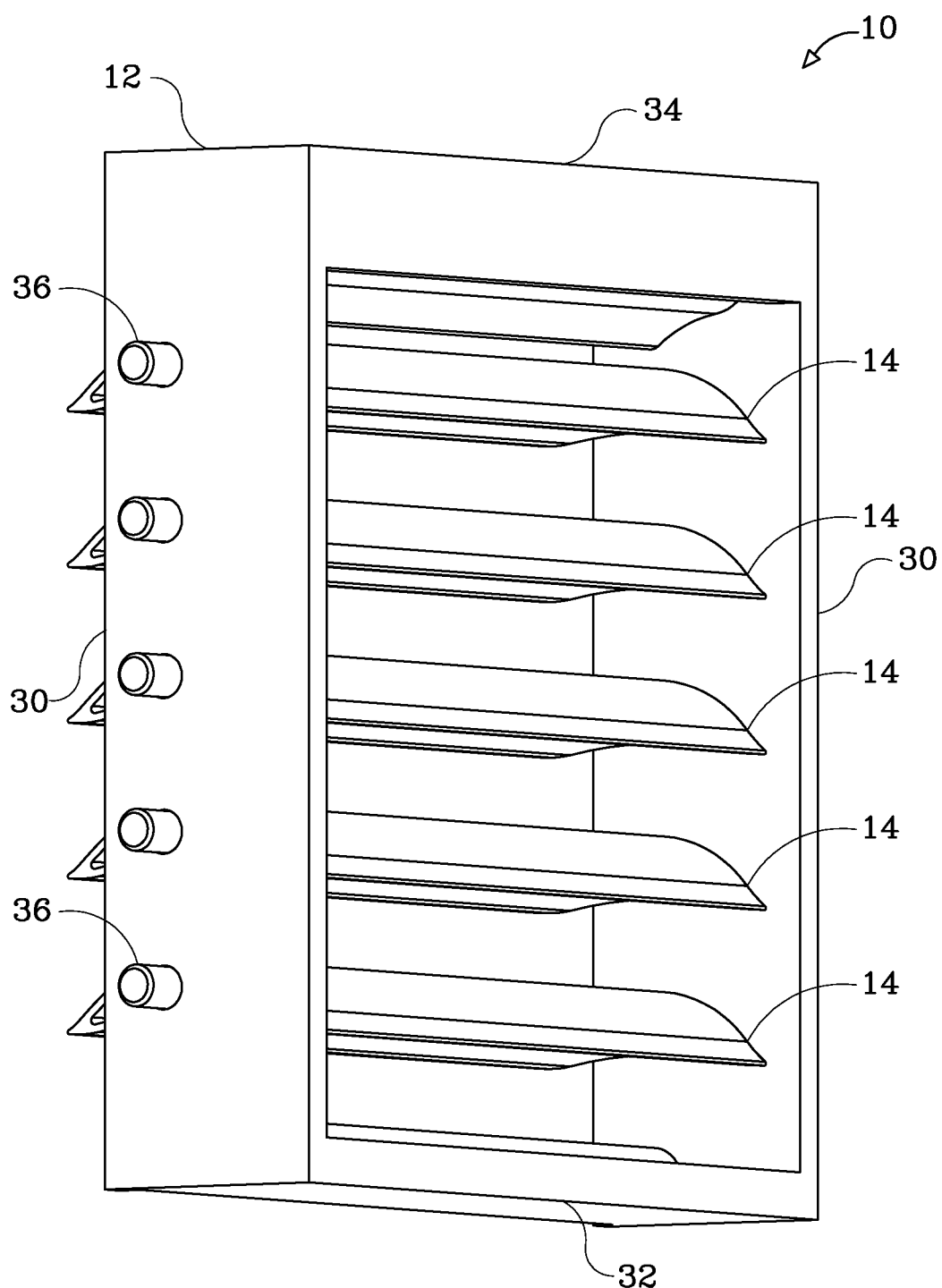
FIG. 1 is a three-dimensional projection of a blast valve comprising a frame and five aerodynamically configured blades, made in accordance to an embodiment of the present invention.

With reference to the figures, according to one embodiment of the present invention, there is shown in FIG. 1, a three-dimensional projection view of a blast valve generally referenced 10 comprising a preferably rectangular frame 12 and by way of example only, five aerodynamically configured blades 14. The blades 14, are independently activated by air flow to block a blast shock wave and a potentially following return wave, as will be described in detail herein below.

Figure 2A:
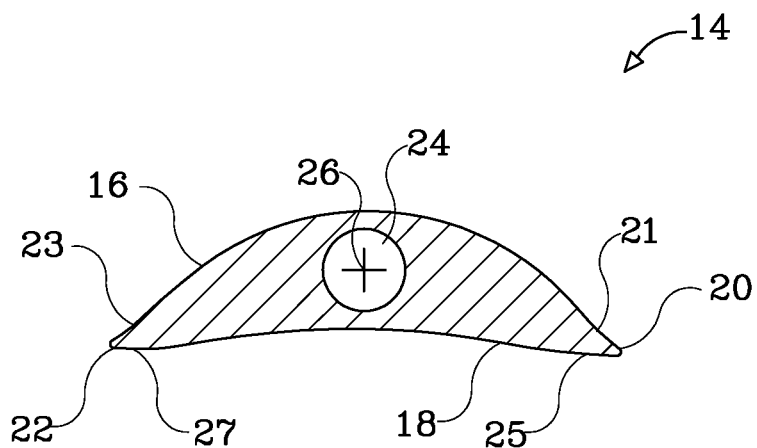
FIGS. 2a and 2b show a cross-sectional view of an aerodynamically configured blade made according to embodiments of the present invention.

The frame 12 comprises two side walls 30, a first lower sealing wall 32 and an opposite second upper sealing wall 34. Through crossing round bars 36, anchored to the frame side walls 30, carries the blades 14 in a manner as will be explained in detail hereinafter. The length of the blades 14 is slightly shorter than the internal width of the frame 12 to allow free rotation of the blades 14 in relation to the frame 12 each about its own longitudinal axis 26 (FIG. 2a). The resultant axial gap is small enough to maintain proper seal of the blast wave at the closed state.

With reference to FIG. 2a, there is shown a cross section through a single aerodynamically configured blade 14. The blade 14 comprising an elongated profile shape, including at least a steep-convex upper surface 16 and a flat or shallow-concave lower surface 18, forming a leading edge 20 and a trailing edge 22 at the front and rear intersection of the surfaces respectively. The leading edge 20 faces the external side of the shelter, first to meat the blast shock wave, while the trailing edge 22 faces the internal side of the shelter, first to meat the return wave. One or both ends of the steep-convex upper surface 16, may trim with small portion of a concave surface 21, 23, and one or both ends of the shallow-concave lower surface 18, may trim with small portion of a convex surface 25, 27. The opposite curvature of the trim surfaces improves air flow and system stability at different air flow rates.

Center mark 26, represents a longitudinal axis of rotation of blade 14. Optional actual embodiment of the rotation mechanism is performed by a through crossing round hole 24 made internally along blade 14. The hole 24 is slightly larger in diameter than the round bars 36 (FIG. 1), to accept round bar 36 and freely rotate about. It will be understood however that short pins extending at both ends of the blade 14 will perform similarly, as well as any other low friction rotation means.

Figure 2B:
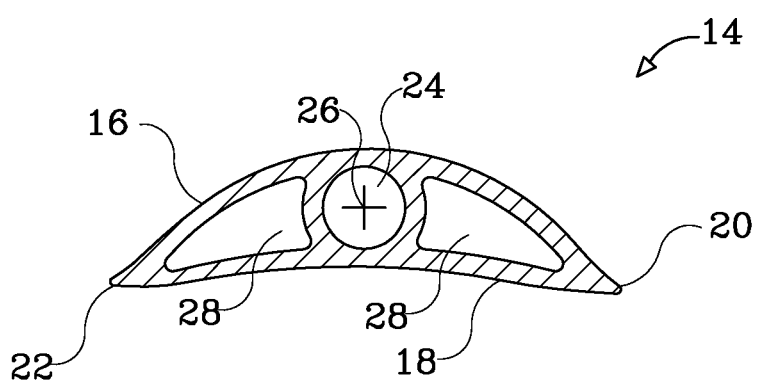

FIG. 2b depicts the same blade 14, having internal cavities 28 along the thick portions of the blade 14 to reduce weight of the blade without degrading the desired strength.

Figure 3:
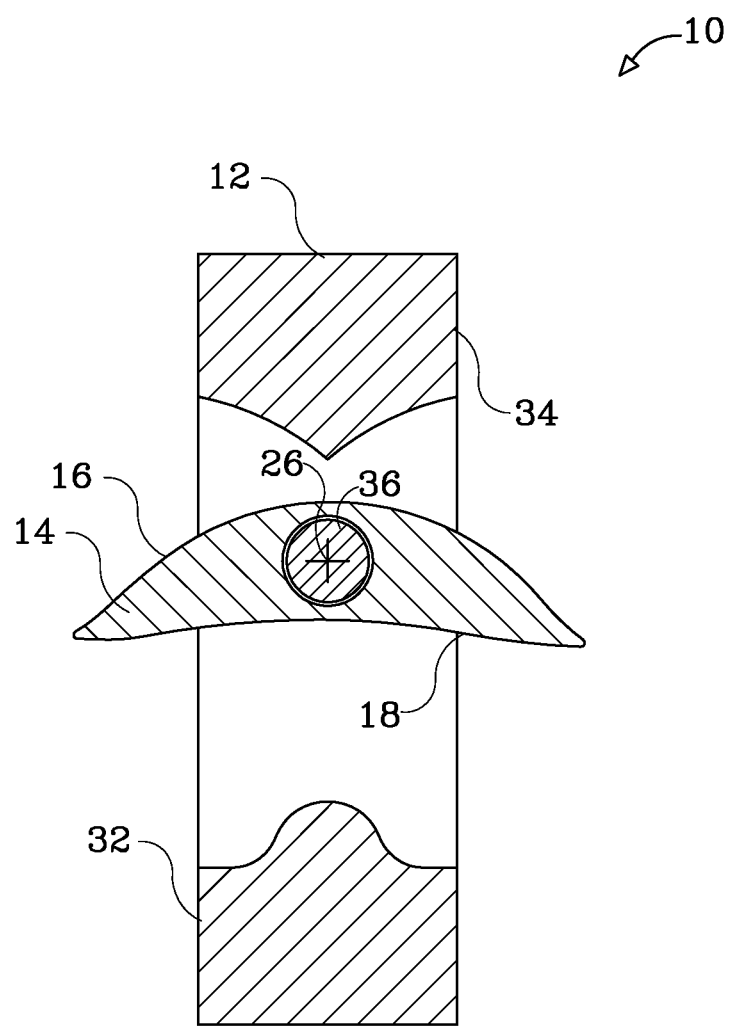
FIG. 3 is a cross-sectional view of a blast valve making use of a single aerodynamically configured blade of FIG. 3, shown in the fully open position.

With reference to FIG. 3, there is shown a cross section through a blast valve 10 using a single blade 14. The blade 14 is loosely hinged to the frame 12 about longitudinal axis 26 passing through the blade 14 approximately at the central thick area between the steep convex surface 16 and the shallow concave surface 18. The orientation of longitudinal axis 26, is typically but not necessarily horizontal, located higher at the cross-section of blade 14 than the sectional center of gravity of the blade, causing the blade to self balance at the open state by its own weight as shown in FIG. 3. The frame 12 comprises at least a first flat or customized lower sealing wall 32 and an opposite second flat or customized upper sealing wall 34. The first lower sealing wall 32 and the second upper sealing wall 34 are preferably parallel, located at a predefined distance from each other.

Figure 4:
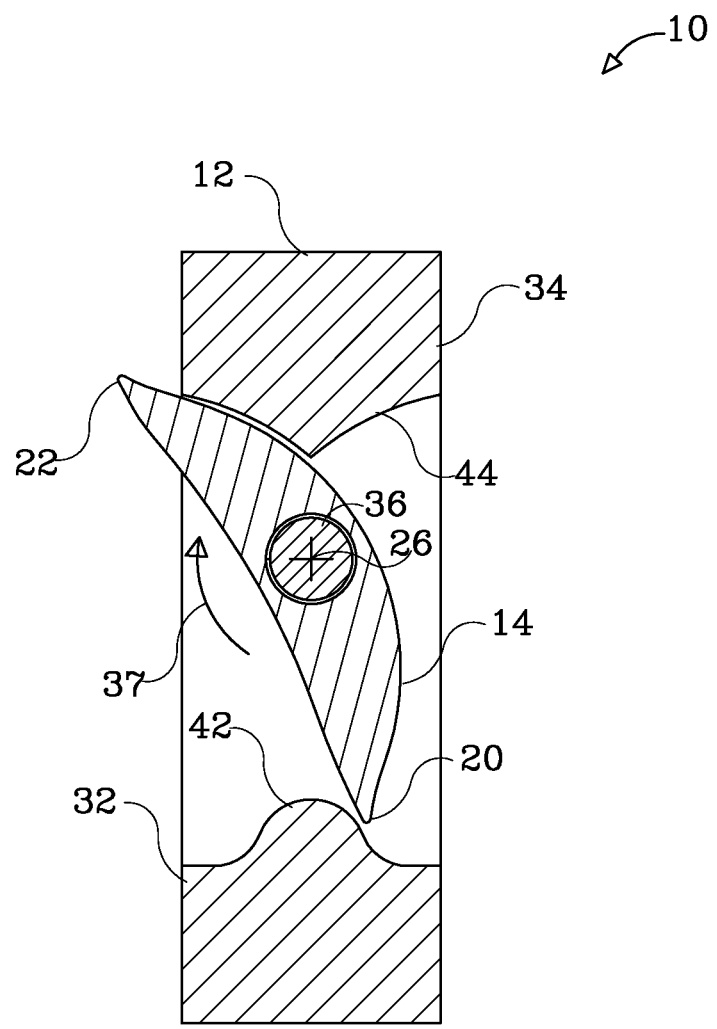
FIG. 4 is a cross-sectional view of a blast valve making use of a single aerodynamically configured blade of FIG. 3, shown in the fully closed position following a blast shock.
Figure 5:
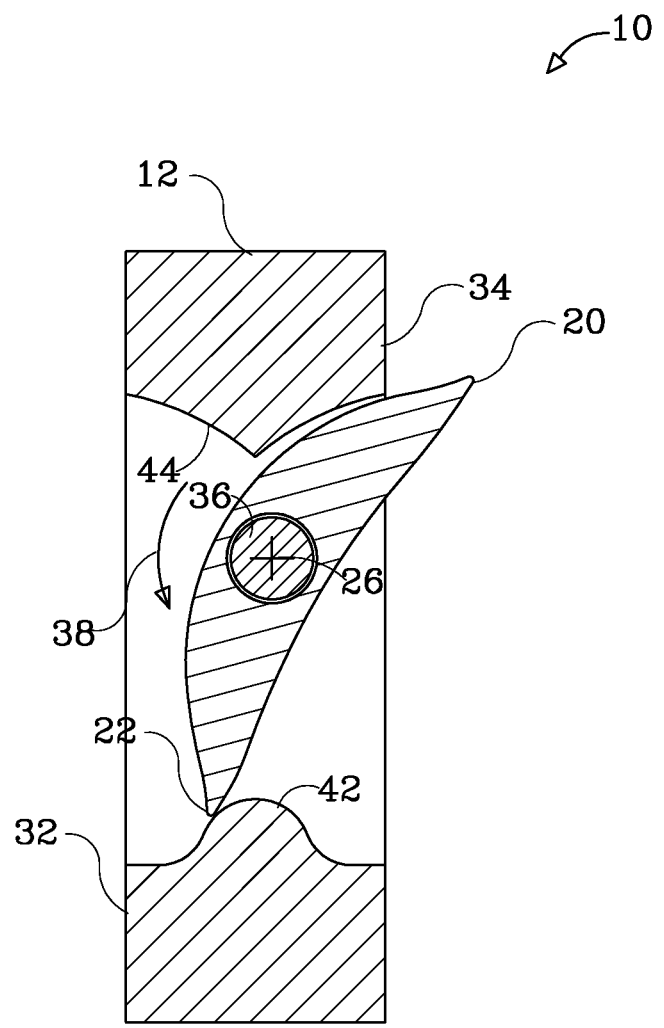
FIG. 5 is a cross-sectional view of a blast valve making use of a single aerodynamically configured blade of FIG. 3, shown in the fully closed position following a return wave.

As shown in FIG. 4, Blocking of a blast shock is performed by aerodynamic forces causing rotation of the blade 14 about axis 26 towards a first direction, here shown clockwise as marked by arrow 37, up to a closed state where the leading edge 20 and the steep-convex upper surface 16 near trailing edge 22 are in contact with the frame first lower sealing wall 32 and opposite second upper sealing wall 34 respectively. The second upper sealing wall 34 may be customized with an internal non flat face 44, and the first lower sealing wall 34 may be customized with an internal non flat face 42. The second upper sealing wall 34 non flat face 44 may accept a symmetrical dual concave surface that fits the steep-convex surface of blade 14 when seated at the closed state, either following a blast shock wave or a return wave, as shown in FIGS. 4 and 5. The first lower sealing wall 32 non flat face 42 may accept a symmetrical wave surface that fits the leading or trailing edge and a portion of the flat or shallow-concave surface of blade 14 when seated at the closed state, either following a blast shock wave or a return wave, as shown in FIGS. 4 and 5. The non flat faces 42, 44 serve to direct the blast shock air flow, to improve sealing and to define exact angular position of the blade 14 during the blast shock wave and return wave closed states.

With reference to FIG. 5, blocking of a return wave is performed by reversal aerodynamic forces causing rotation of the blade 14 about axis 26 towards a second direction, here shown counter clockwise as marked by arrow 38, up to a closed state where the trailing edge 22 and the steep-convex upper surface 16 near leading edge 20 are in contact with the frame first lower sealing wall 32 and opposite second upper sealing wall 34 respectively.

Figure 6:
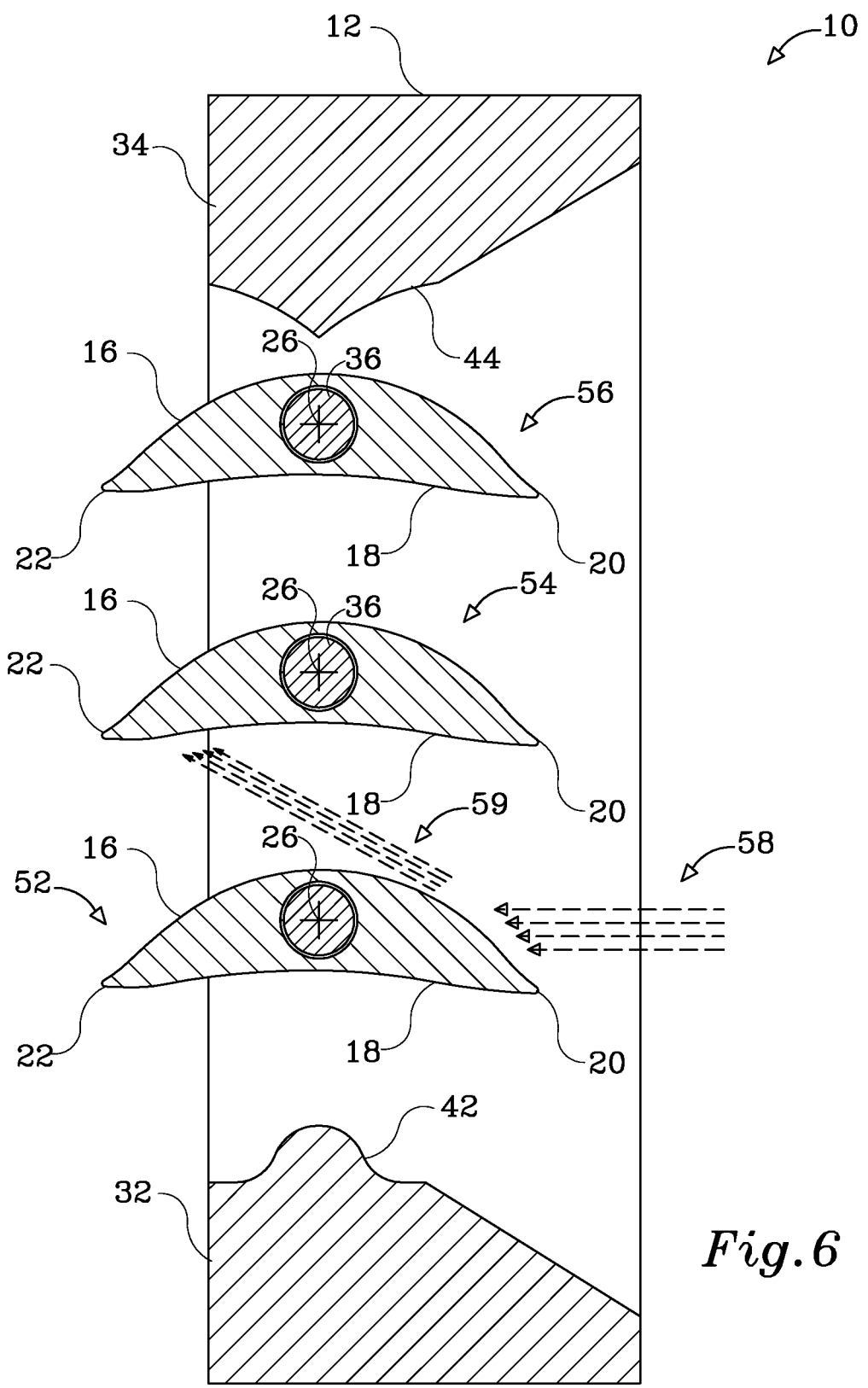
FIGS. 6 and 6a, are cross-sectional views of a blast valve making use of three aerodynamically configured blades, shown in the fully open state and in a partially closed state respectively, with schematic air flow lines.

FIG. 6, depicts a blast valve 10, comprising by a way of example only, three blades generally marked 52, 54, 56, equally spaced apart, loosely hinged to the frame 12 as described above with reference to FIGS. 2a to 5. The dotted lines generally marked 58 and 59, indicate the direction of the force exerted by the air flow as taught by numeric simulation and field tests. Taking a look for example at the central blade marked 54, the blast shock wave force lines marked 58, hit the steep convex upper surface 16 of blade 52 right after its leading edge 20. The air flow is forced upwardly pushing down as a reaction, the leading edge 20 side of blade 52. Instantly following, the air flow force lines marked 59 hit the shallow concave lower surface of the upper blade marked 54 right before its trailing edge 22. The air flow is forced downwardly pushing up as a reaction, the trailing edge 22 side of blade 54. It will be understood that the same effect applies to all of the blades simultaneously thus forcing the blades to rotate clockwise at the plane of FIG. 6, each about its own axis 26 to the partially closed state as shown in FIG. 6a.

Figure 6A:
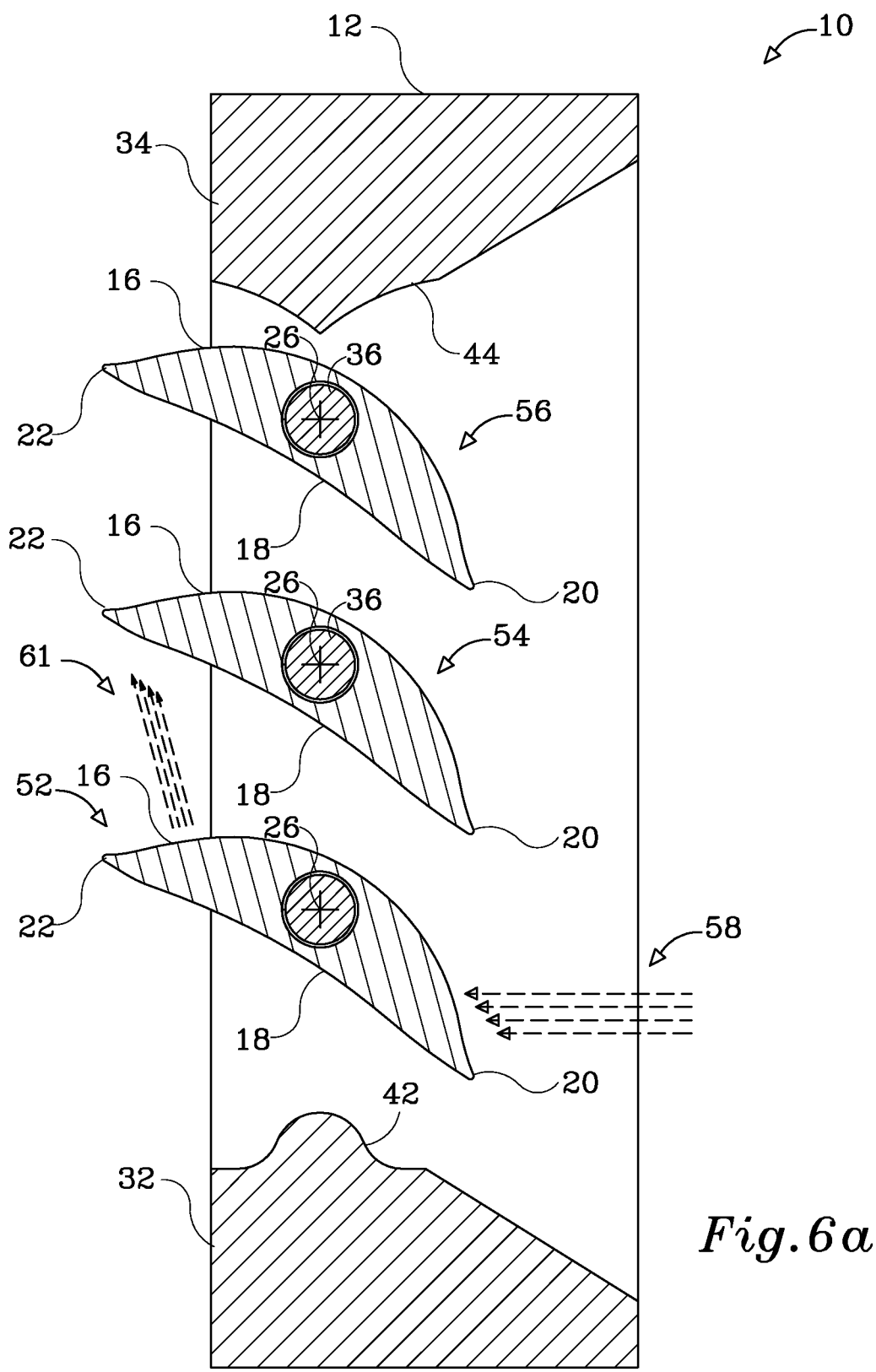

At the partially closed state shown in FIG. 6a, the force lines of the blast shock wave marked 58, apply as above but more effectively to the steep convex upper surface 16 of blade 52 right after its leading edge 20. However due to the different geometry, the reaction force marked 59 in FIG. 6, is less effective at the partially closed state, wherein suction forces marked 61 in FIG. 6a, are pulling up the steep convex upper surface 16 of blade 52 right before its trailing edge 22. The suction forces marked 61, are created by the rapid air flow and according to the Bernoulli principal. Accordingly the blades rotate further up to the closed state as shown in FIG. 7.

Figure 7:
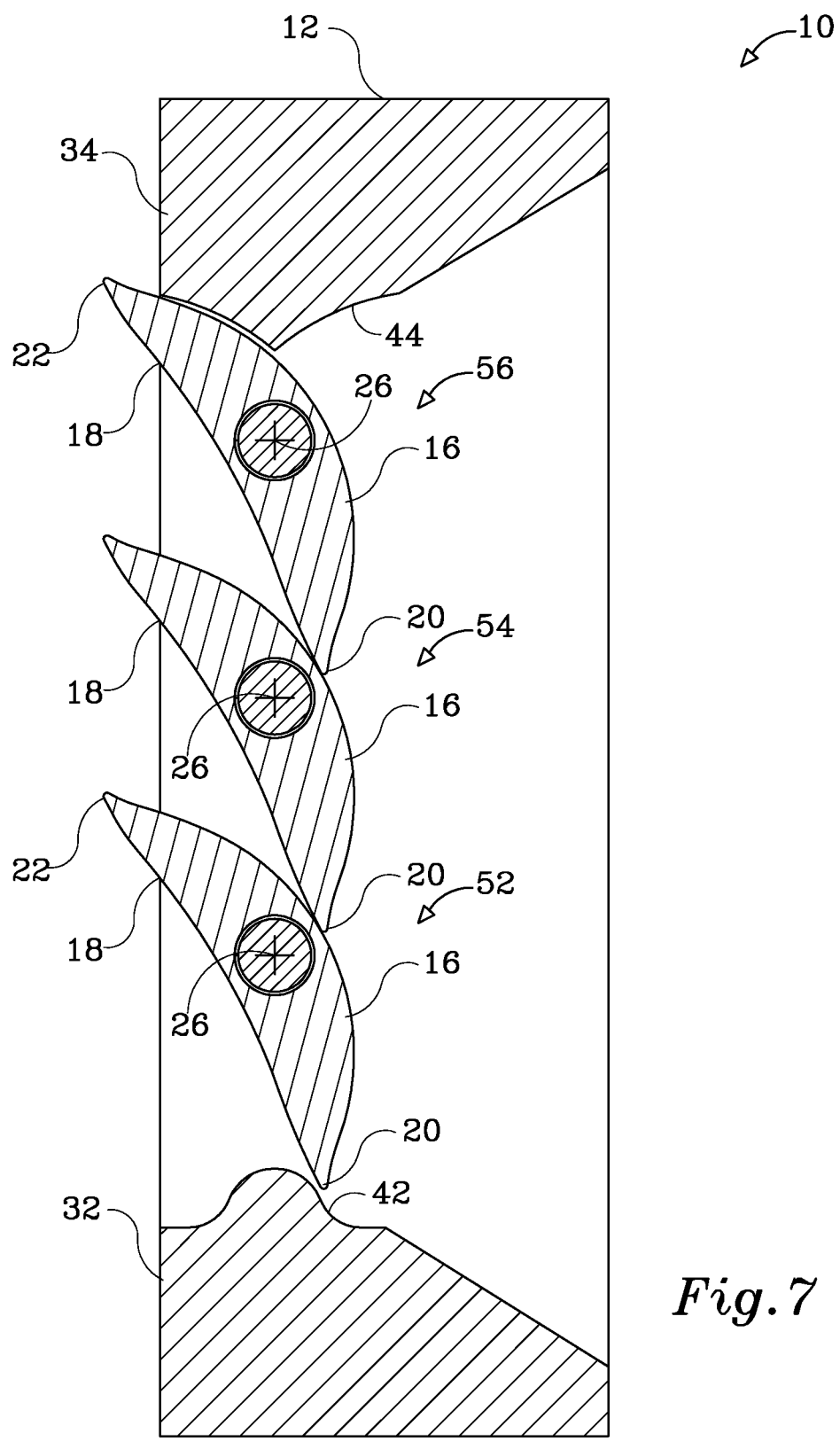
FIG. 7 is a cross-sectional view of a blast valve as in FIG. 6, shown in the fully closed position following a blast shock.

With reference to FIG. 7, there is shown the blast valve of FIG. 6 at the closed state following a blast shock wave. Blocking of a blast shock wave is performed by the aerodynamic forces causing rotation of the blades 14, each about its own axis 26, towards a first direction shown clockwise, up to a closed state where the leading edge 20 of one of the blades (54 for instance) is in contact with the steep convex surface 16 of a lower adjacent blade (52 for instance). The uppermost blade 56 convex surface 16 near the trailing edge 22, is in contact with the frame second upper sealing wall 34. While the lowermost blade 52 leading edge 20 is in contact with the frame first lower sealing wall 32. It will be understood that any number of blades can be provided as long as the correct distance between rotation axes 26 is kept.

Figure 8:
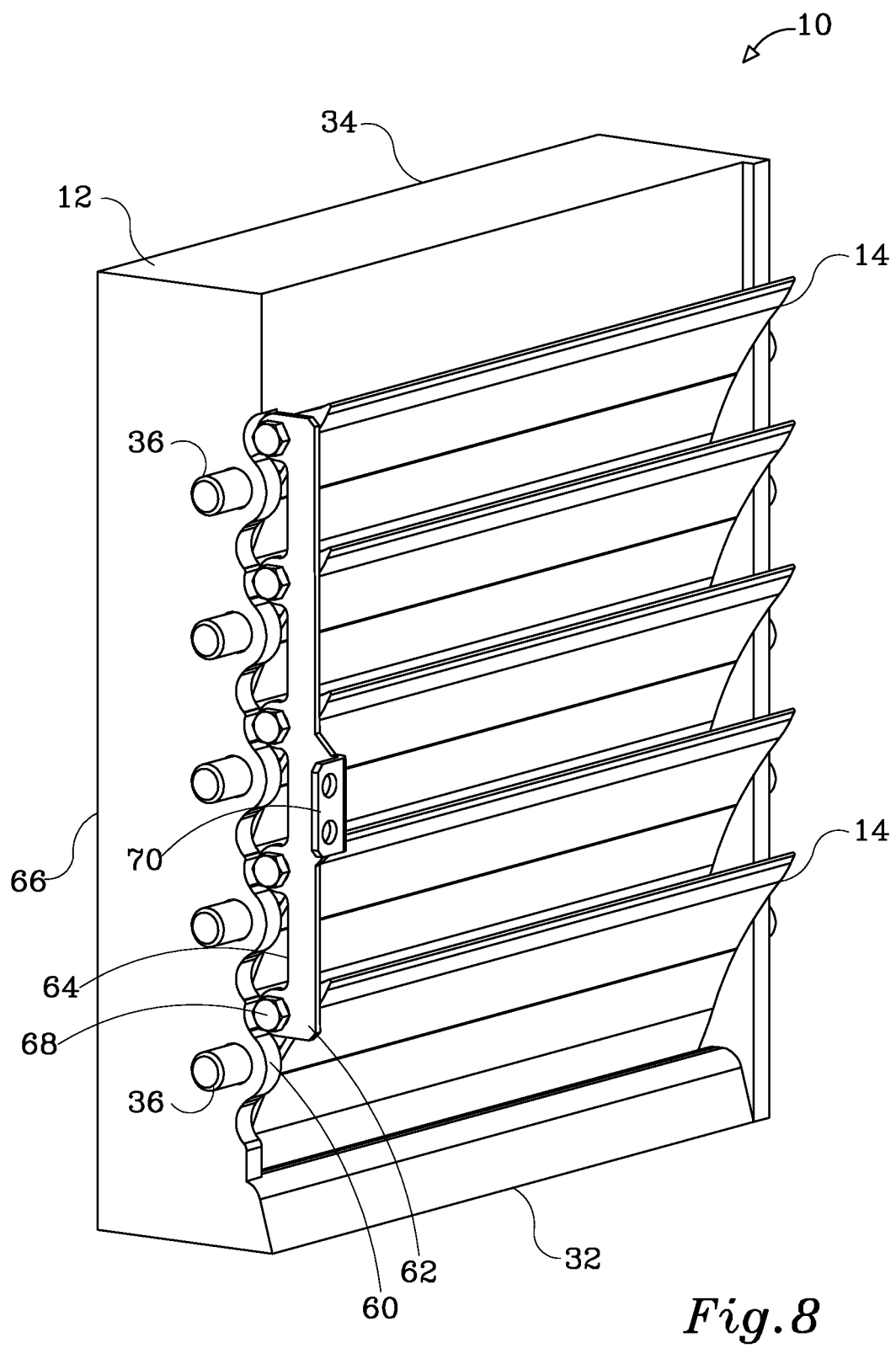
FIG. 8 is a cross-sectional view of a blast valve of FIG. 1, shown with a connecting linkage bar.

Referring to FIG. 8, there is demonstrated a blast valve made according to an embodiment of the present invention equipped with five blades by a way of example, shown from the rear side (shelter internal) at the closed state following a blast shock wave. In addition to the previously disclosed options, here a plurality of blades 14 are swivel-ably interconnected to each other with a linkage bar 62 synchronizing rotation of the blades 14, each about its own axis, in order to prevent delay or temporarily failure of one of the blades to freely rotate about its axis. In more detail, one of the side walls 66 of frame 12 is defined by a wavy rear face 60 clearing space for a complementary linkage bar 62 with recesses 64 facing the wavy face 60. Each of the blades is swivel-ably secured at a fixed distance from the rotation axis 26, to the linkage bar by a headed pin or shoulder bolt 68. In operation, the wavy face 60 permits about 120° circular motion of the blades 14 attached to the linkage bar 62 without mechanical interference of the linkage bar 62 and side wall 66.

Another advantage relating to the linkage bar 62, is the ability to apply a biasing spring (not shown) attached to the linkage bar biasing extension 70. The biasing spring forces the blades to the open state in cases where the blades axis 26 orientation is vertical, or if the self weight of the blades is not sufficient to keep the blades in the open state during normal or moderate air flow conditions.

Figure 9:
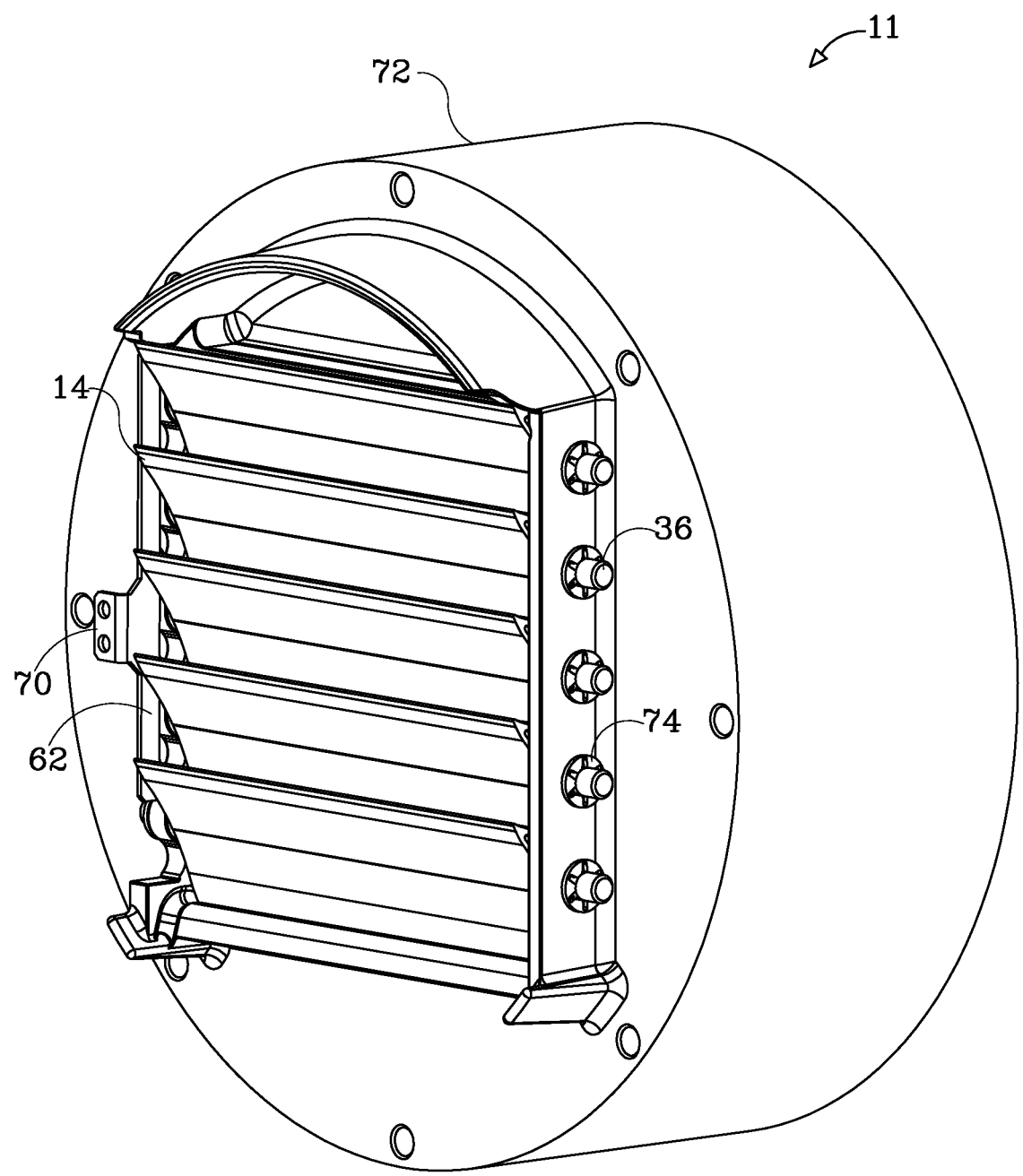
FIG. 9 is a three-dimensional projection of a blast valve having an external cylindrical frame, shown with five blades at the closed state following a blast shock wave.

With reference to FIG. 9, there is shown an implementation of blast valve 11 in a frame 72 having an external cylindrical shape, shown with five blades by a way of example at the closed state following a blast shock wave. The basic structure of the internal frame and blades is similar to the above described alternatives. However the frame 72 external cylindrical shape can be readily installed in common existing round ventilation ducts as known in the art of NBC shelters. The open surface area between the blades at the open position permits full flow of air in the duct with minimal losses, such that the existing duct is sufficient in size to provide proper ventilation even with the blast valve 11 fitted. Lock washers 74 are provided to the round bars 36 at both ends to secure the round bars 36 in position.

Figure 12:
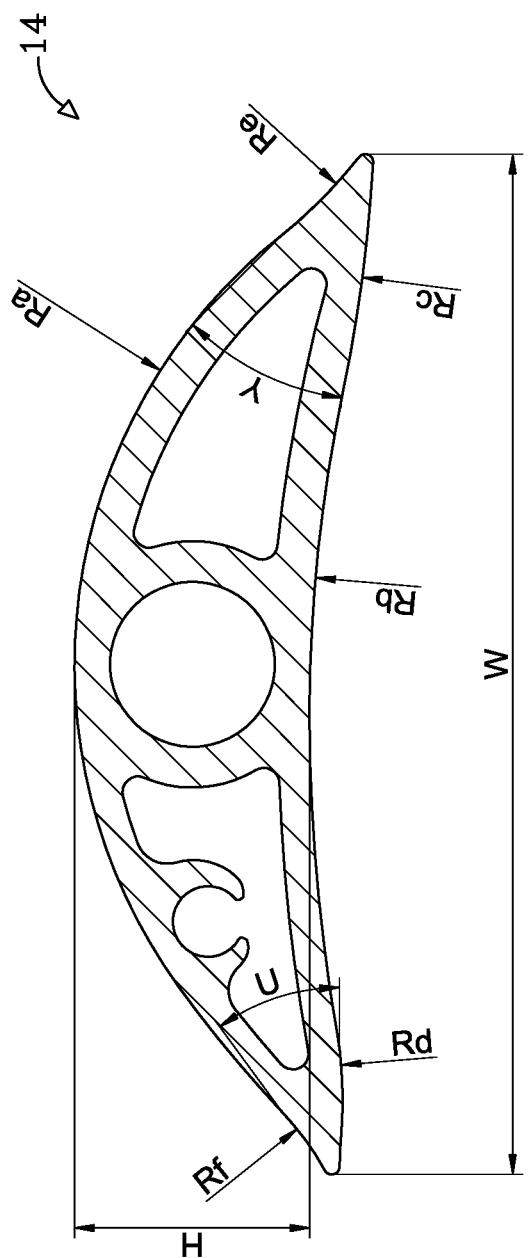
FIG. 12 is a cross-sectional view of an aerodynamically configured blade as shown in FIGS. 2a and 2b with symbolic dimensional letters.

With reference to FIG. 12, and in view of FIGS. 2a and 2b, there is shown a cross section through a single aerodynamically configured blade 14, with symbolic dimensions. The actual dimension range will be listed in order to demonstrate what is believed to be the most optimal shape of blade 14, in order to achieve the goals of the present invention. The basic width of the blade cross section marked W is in the range of 60 mm to 70 mm. The height at the mid portion marked H is in the range of 15 mm to 20 mm. The steep-convex upper surface 16 radius marked Ra, is in the range of 30 mm to 40 mm. The flat or shallow-concave lower surface 18 radius marked Rb, is at least 80 mm and up to flat surface. The leading edge 20 angle marked Y, is between 30 to 40 degrees, and the trailing edge 22 angle marked U, is between 25 to 35 degrees. The radius of the small portions of a concave surface 21 and 23, trimming the steep concave upper surface 16, marked Re and Rf respectively, are in the range of 15 mm to 40 mm. The radius of the small portions of a convex surface 25 and 27 trimming the shallow concave lower surface 18, marked Rc and Rd respectively, are in the range of 80 mm to 120 mm. It will be understood that scaling the above dimensions by a common factor will maintain the basic shape of the blade cross section and will provide similar functionality.

Figure 10:
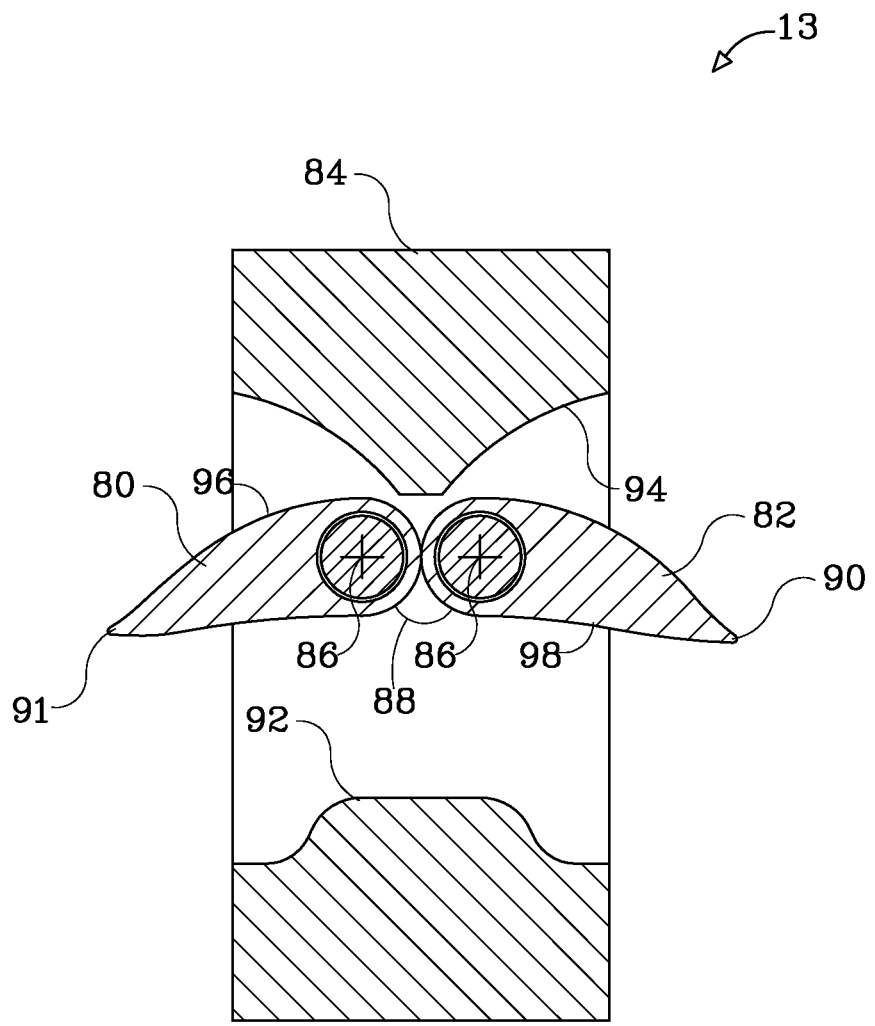
FIG. 10 is a cross-sectional view of a blast valve making use of a dual aerodynamically configured blades, shown in the fully open position.
Figure 11:
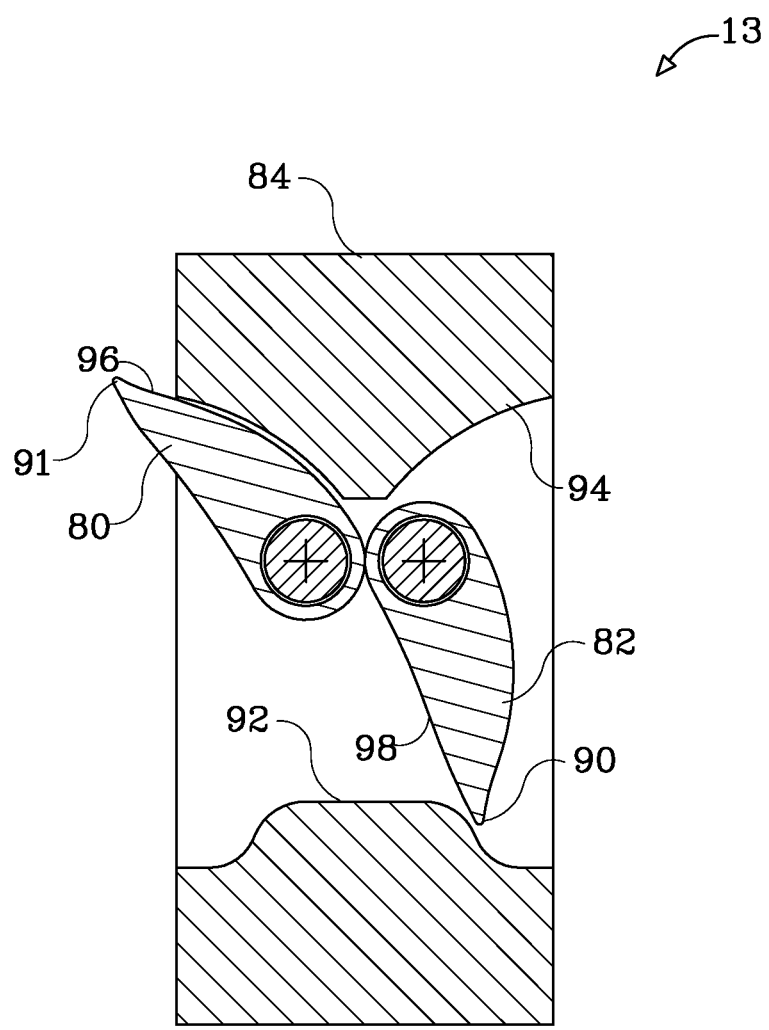
FIG. 11 is a cross-sectional view of the blast valve of FIG. 10, shown in the fully closed position following a blast shock wave.

With reference to FIGS. 10 and 11, and in view of FIGS. 3 and 4, there is shown a blast valve generally referenced 13, made in accordance with another embodiment of the present invention, where instead of a single blade as shown in FIGS. 3 and 4 there is a first half-blade 80 and a second half-blade 82, each hinged to the frame 84 about its own axis 86.

Each of the two blade-halves 80, 82 have a semi circular rounded face 88 at a first side, centric with the axis of rotation 86. The second side of blade-halves 80, 82 includes at least a steep-convex upper surface 96 and a flat or shallow-concave lower surface 98, forming a leading edge 90 on second half-blade 82 and a trailing edge 91 on first half-blade 80 at the intersection of the surfaces as described herein-above with reference to the first embodiment. The semi circular rounded faces 88 are positioned in close proximity to each other, such as to permit angular displacement of the blades in relation to each other while preventing air flow between the blades.

The first and second half-blades 80, 82 are independently activated by air flow to block a blast shock wave and a potentially following return wave, as explained hereinabove with relation to the first embodiment of the present invention. Spring biasing (not shown) is required to force the blades to the open state as shown in FIG. 10. Blocking of a blast shock is performed by aerodynamic forces causing rotation of the blade-halves 80, 82 each about its own axis 86 towards a first direction, here shown clockwise, up to a closed state where the leading edge 90 of second half-blade 82 and the steep-convex upper surface 96 near trailing edge 91 of first half-blade 80 are in contact with the frame first lower sealing wall 92 and opposite second upper sealing wall 94 respectively as shown in FIG. 11.

It will be appreciated that the specific embodiments of the present invention described above and illustrated in the accompanying drawings are set forth merely for purposes of example. Other variations, modifications, and applications of the present invention will readily occur to those skilled in the art. It is therefore clarified that all such variations are considered within the scope and spirit of the invention. Accordingly, the protection sought herein is as set forth in the claims below.

The invention claimed is:

1. A blast valve comprising a frame and at least one aerodynamically configured blade, independently activated by air flow to block a blast shock and a potentially following return wave, said frame comprises at least a first sealing wall and an opposing second sealing wall said aerodynamically configured blade comprising: an elongated shape, including at least a steep convex surface and a flat or shallow concave surface, forming a leading edge and a trailing edge at the intersection of said surfaces, said blade being hinged to said frame about a longitudinal axis passing between said steep convex surface and said flat or shallow concave surface, wherein blocking of said blast shock is performed by aerodynamic forces causing rotation of said at least one blade about said axis towards a first direction up to a closed state and wherein blocking of said return wave is performed by rotation of said at least one blade about said axis towards a second direction up to a closed state.

2. The blast valve as claimed in claim 1, wherein blocking of said blast shock is performed by aerodynamic forces causing rotation of said blade about said axis towards a first direction up to a closed state where said leading edge and said steep convex surface near said trailing edge are in contact with said frame first sealing wall and opposite second sealing wall respectively.

3. The blast valve as claimed in claim 1, wherein blocking of said return wave is performed by rotation of said blade about said axis towards a second direction up to a closed state where said steep convex surface near said leading edge and said trailing edge are in contact with said frame second sealing wall and opposite first sealing wall respectively.

4. The blast valve as claimed in claim 1, wherein said second sealing wall comprises a non flat face shaped as a symmetrical dual concave surface that fits the steep-convex surface of said blade when seated at the closed state, either following a blast shock wave or a return wave.

5. The blast valve as claimed in claim 1, wherein said first sealing wall comprises a non flat face shaped as a symmetrical wave surface that fits the leading or trailing edge and a portion of the flat or shallow-concave surface of said blade when seated at the closed state, either following a blast shock wave or a return wave.

6. The blast valve as claimed in claim 1, wherein said blast valve comprising two or more of said blades, equally spaced apart, hinged to said frame, wherein blocking of said blast shock is performed by aerodynamic forces causing rotation of said blades, each about its own axis, towards a first direction up to a closed state where said leading edge of one of the blades is in contact with said steep convex surface near said trailing edge of an adjacent blade.

7. The blast valve as claimed in claim 1, wherein said blast valve comprising two or more of said blades, equally spaced apart, hinged to said frame, wherein blocking of said return wave is performed by aerodynamic forces causing rotation of said blades, each about its own axis, towards a second direction up to a closed state where said trailing edge of one of the blades is in contact with said steep convex surface near said leading edge of an adjacent blade.

8. The blast valve as claimed in claim 1, wherein the orientation of said longitudinal axis is horizontal, located higher at the cross-section of said blade than the sectional center of gravity of said blade, causing the blade to self balance at the open state by its own weight.

9. The blast valve as claimed in claim 1, wherein a plurality of said blades are swivel-ably interconnected to each other with a linkage bar synchronizing rotation of the blades.

10. The blast valve as claimed in claim 9, wherein a biasing spring is attached to said linkage bar, forcing said blades to the open state.

11. The blast valve as claimed in claim 1, wherein said blade is loosely hinged to said frame about said longitudinal axis.

12. The blast valve as claimed in claim 1, wherein said frame comprises an external cylindrical shape that can be installed in common existing round ventilation ducts.

13. The blast valve as claimed in claim 1, wherein one or both ends of said steep-convex upper surface, trims with a small portion of a concave surface and one or both ends of said shallow-concave lower surface, trims with a small portion of a convex surface.

14. The blast valve as claimed in claim 13, wherein the basic width of said blade cross section is in the range of 60 mm to 70 mm, the hight at the mid portion of said blade is in the range of 15 mm to 20 mm, said steep-convex surface radius is in the range of 30 mm to 40 mm, said flat or shallow-concave surface radius is at least 80 mm and up to a flat surface, said leading edge angle is between 30 to 40 degrees, and said trailing edge angle is between 25 to 35 degrees, the radius of said small portions of concave surface trimming the steep concave upper surface are in the range of 15 mm to 40 mm, the radius of said small portions of a convex surface trimming the shallow concave surface are in the range of 80 mm to 120 mm.

15. The blast valve as claimed in claim 14, wherein the indicated dimensions are scaled by a common factor.

16. A blast valve comprising a frame and at least a first aerodynamically configured half-blade and a second aerodynamically configured half-blade, each of said half-blades being hinged to said frame about its own axis, independently activated by air flow to block a blast shock and a potentially following return wave, each of said aerodynamically configured first and second half-blades comprising: a semi circular rounded face at a first side, centric with said axis, and at least a steep-convex surface and a flat or shallow-concave surface at a second side, the intersection of said steep-convex and flat or shallow-concave surfaces forming a leading edge on said second half-blade and a trailing edge on said first half-blade, and wherein said semi circular rounded faces of said first half-blade and said second half-blade are facing each other, positioned in close proximity.

17. The blast valve as claimed in claim 16, wherein spring biasing is forcing the blades to the open state.

18. The blast valve as claimed in claim 16, wherein blocking of a blast shock is performed by aerodynamic forces causing rotation of the blade-halves each about its own axis towards a first direction, up to a closed state where the leading edge of the second half-blade and the steep-convex upper surface near the trailing edge of the first half-blade are in contact with the frame first sealing wall and opposite second sealing wall respectively.

* * * * *